April 2, 1946.  P. VAN SITTERT  2,397,892
FASTENER
Filed Dec. 3, 1942  3 Sheets-Sheet 1
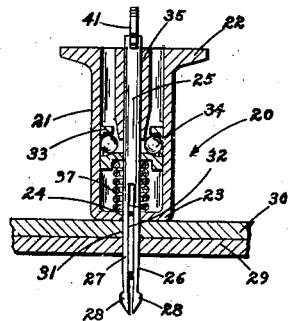
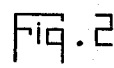
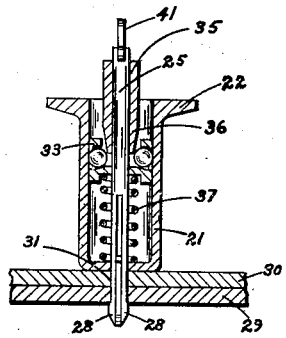
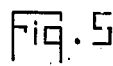
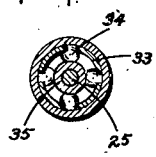
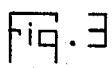
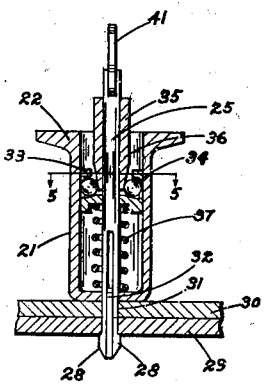
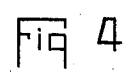
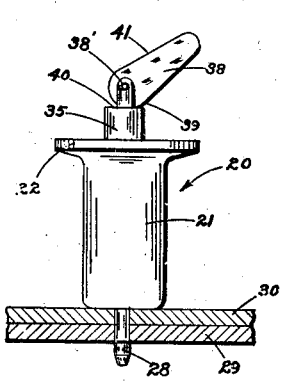
INVENTOR
PAUL VAN SITTERT
BY
ATTORNEY April 2, 1946.    P. VAN SITTERT    2,397,892
FASTENER
Filed Dec. 3, 1942    3 Sheets-Sheet 2
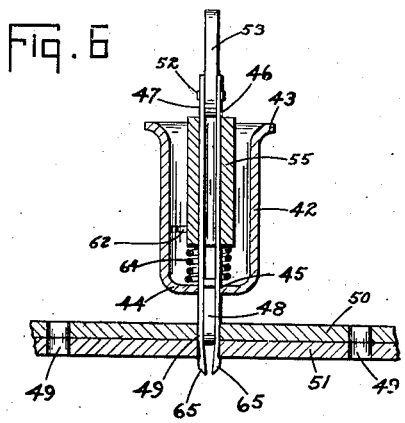
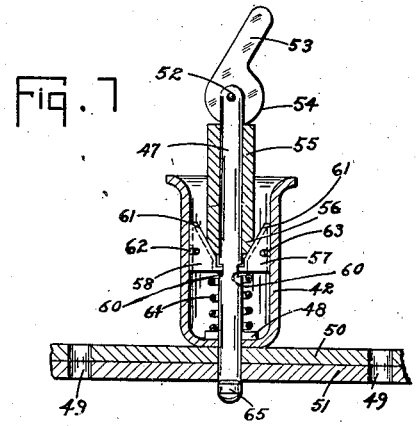
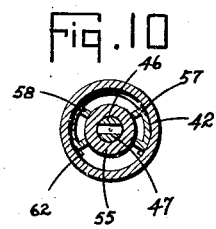
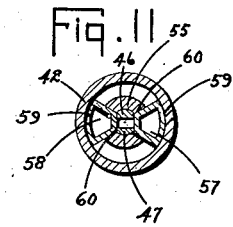
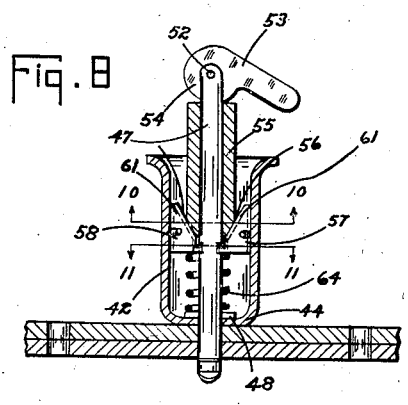
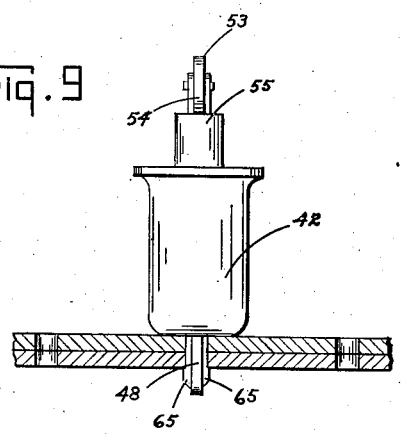
INVENTOR
PAUL VAN SITTERT
BY
ATTORNEY

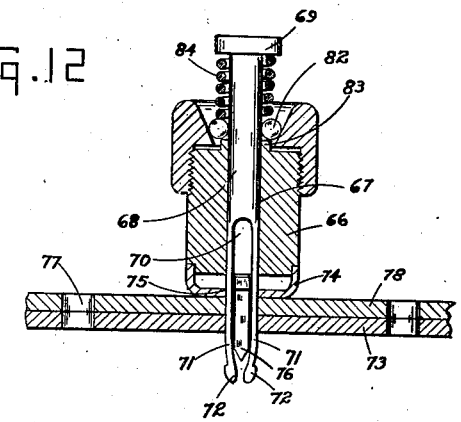
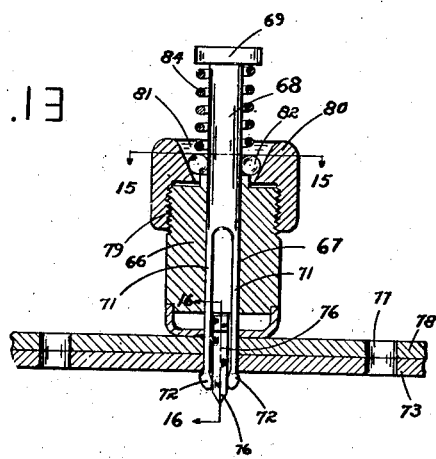
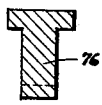
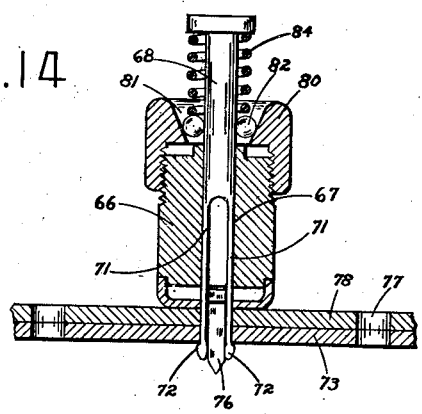
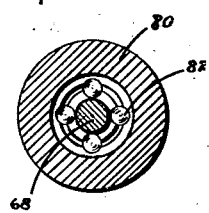

Patented Apr. 2, 1946

2,397,892

UNITED STATES PATENT OFFICE 2,397,892

FASTENER

Paul Van Sittert, Shaker Heights, Ohio, assignor to The Cleveland Pneumatic Tool Company, Cleveland, Ohio, a corporation of Ohio Application December 3, 1942, Serial No. 467,706

10 Claims. (Cl. 85—5)

The present invention relates to fasteners for temporarily holding together perforated plates or sheets in superposed relation preparatory to riveting or the like.

One of the objects of the invention is to provide a fastener or temporary rivet which may be readily applied to or removed from the work, and constituting a simple assembly which is strong, durable and efficient.

Another object resides in the provision of novel means associated with the body of the fastener for firmly clamping the same to the upper face of the perforated plates or sheets to be riveted.

Another object is the provision in a spring operated fastener of means for locking the relatively movable elements of the fastener in their operative position whereby in the event of stem breakage there will be no violent ejection of the stem.

A further object of the invention is to provide a fastener of the above character including a retaining stem mounted for slidable movement in a housing, said stem being split longitudinally to form a pair of sections adapted to be inserted through aligned holes provided in the superposed plates or sheets, and means adapted to be actuated after insertion of the sections through the aligned holes for urging the housing into locked engagement with the upper face of the perforated plates or sheets to be riveted.

A still further object of the invention resides in the provision of a fastener having the above characteristics in which novel means is employed for effecting a wedging action between the slidable stem and housing after insertion of the stem through the aligned holes for locking said housing relative to said stem in plate clamping position.

Another object of the invention is to provide a temporary fastener which does not require the use of special tools for inserting or removing the same from the perforated plates or sheets to be riveted.

Other objects and advantages more or less ancillary to the foregoing reside in the specific construction and aggroupment of the elements peculiar to this structure, as will become apparent from a more complete examination of this specification.

In the drawings which illustrate the invention:

Fig. 1 is a vertical sectional view of the improved fastener shown in the position assumed during the first step of its application to the work.

Fig. 2 is a view similar to Fig. 1 illustrating the position assumed by the fastener during the second step of its application to the work.

Fig. 3 is a vertical sectional view similar to Fig. 1 illustrating the fastener in locked position.

Fig. 4 is an elevational view of the fastener in locked position, the sheets to be riveted being shown in section.

Fig. 5 is a transverse sectional view taken substantially on line 5—5 of Fig. 3.

Fig. 6 is a vertical sectional view of a modified form of fastener shown in the position assumed during the first step of its application to the work.

Fig. 7 is a vertical sectional view at right angles to that of Fig. 6 and illustrating the position assumed by the fastener during the second step of its application to the work.

Fig. 8 is a view similar to Fig. 7 illustrating the fastener in locked position on the work.

Fig. 9 is an elevational view of the locked fastener.

Fig. 10 is a detail sectional view taken substantially on line 10—10 of Fig. 8.

Fig. 11 is a detail sectional view taken substantially on line 11—11 of Fig. 8.

Fig. 12 is a vertical sectional view of a still further modified form of the invention illustrating the fastener shown in the position assumed during the first step of its application to the work.

Fig. 13 is a view similar to Fig. 12 illustrating the position assumed by the fastener during the second step of its application to the work.

Fig. 14 is a view similar to Fig. 12 illustrating the fastener in locked position.

Fig. 15 is a detail sectional view taken substantially on line 15—15 of Fig. 13.

Fig. 16 is a detail sectional view of the spreader taken substantially on line 16—16 of Fig. 13.

Referring to the drawings for a more detailed description thereof, and particularly to the preferred form of the invention as illustrated in Figs. 1 to 5, a temporary fastener embodying the features of the present invention is generally designated by the reference numeral 20 and comprises a substantially cylindrical shaped housing 21 formed at its upper end with an external annular flange 22, and having its lower end formed by a cross-wall or base 23 having a cylindrical central bore 24 formed therein and extending therethrough. A rod or stem 25 is slidably mounted within the housing 21, the lower end thereof extending through the central bore 24. The stem 25 is split longitudinally for a portion of its length to provide a pair of sections 26 and 27 and each section is formed with an enlarged end 28 adapted to engage the lower sheet 29 as will be hereinafter more fully described. As is to be understood, the fastener 20 is designed to hold the sheets 29 and 30 in perfect perforate alignment, the sections 26 and 27 being inserted through the rivet holes 31 provided through the sheets 29 and 30. Resting on the base 23 and projecting through the central bore 24 is a T-shaped spreader 32, said spreader being disposed between the sections 26 and 27.

On the stem 25 there is fixed by any suitable means a ring 33 forming a cage for a series of balls 34. The ring 33 and the stem 25 therefore move as a unit. Slidably mounted on the upper end of the stem 25 there is a sleeve 35 the lower end of which is tapered as indicated at 36 for engagement with the balls 34 when the housing 21 and stem 25 are to be locked against relative movement.

Interposed between the lower end of ring 33 and the T head of spreader 32 is a compression spring 37 for urging the ring 33 and consequently the stem 25 upwardly relative to the housing. The engagement of the spring with the head of spreader 32 serves the additional purpose of retaining the spreader in a relatively fixed position at all times.

The upper end of the stem 25 is formed with a slot in which is positioned a lever 38, said lever being pivotally supported on a cross-pin 38'. The pivoted end of the lever 38 is formed with a cam surface 39 adapted for engagement with the upper end 40 of the sleeve 35 for urging said sleeve downwardly on the stem 25 into engagement with the balls 34 whereby said balls will be forced outwardly into frictional engagement with the housing 21.

Referring to the operation of the device, let it be assumed that the work to be riveted consists of the two superposed sheets 29 and 30. Manual pressure is exerted downwardly on the stem 25, at which time the lever 38 will have been swung counterclockwise on its pivot approximately 180° from the position shown in Fig. 4 so that its surface 41 is in substantial engagement with the end 40 of the sleeve 35 as shown in Figs. 1 and 2 of the drawings, thereby freeing the tapered end of the sleeve 35 from operative engagement with the balls 34. As the stem 25 is moved downwardly, it carries the sleeve 35 and ring 33 with the latter compressing the spring 37. This downward movement projects the sections 26 and 27 beyond the spreader 32 so that the enlarged ends 28 can be flexed inwardly as contact is made with the walls of the hole 31 and are therefore free to be inserted through said hole 31 until the base 23 rests upon the upper face of the sheet 30, as illustrated in Fig. 1. Upon the release of downward pressure on the stem 25, the spring 37 will force the ring 33 and stem 25 upwardly until the enlarged ends 28 engage the lower sheet of the work, as illustrated in Fig. 2. The sheets 29 and 30 are thus clamped between the enlarged ends 28 and base of the housing 21, the spring 37 maintaining the clamped relation. The lever 38 is then swung clockwise on its pivot from the position shown in Figs. 1 and 2 to that shown in Figs. 3 and 4 and upon applying pressure on the free end of said lever, its cam surface 39 will engage the end 40 of the sleeve 35 to slide said sleeve downwardly relative to the stem 25 and, as the tapered end 36 contacts the balls 34, the latter will be moved outwardly into engagement with the walls of the housing 21 thereby locking said housing to the sheet. In this locked position, the stem 25 is held against slidable movement relative to the housing 21 and sheets 29 and 30. When desiring to remove the fastener, the lever 38 is swung on its pivot to the position illustrated in Figs. 1 and 2 whereupon the stem 25 may be manually urged downwardly compressing the spring 37 and while held in that position the sections 26 and 27 are withdrawn from the hole 31. When the lever 38 is in locking position the parts 21 and 25 are rigid with each other and the action of the device is then independent of the spring 37. When the lever is thrown to unlocking position the spring again resumes its duty. Now when the operator, desiring to remove the device, depresses stem 25, he pushes ring 33 downward, relieving the pressure of the balls against the tapered surface of sleeve 36 and freeing the stem from the housing. The stem may then be depressed further to bring the parts into the condition shown in Fig. 1, whereupon the device may be withdrawn from the work.

In the modified form of the invention shown in Figs. 6 to 11, the slidable stem is also locked relative to the housing by a wedging means. In this form, however, the ball carrying ring is dispensed with and use is made of a pair of diametrically opposed wedge shaped members that are positioned within the housing and capable of slidable movement with the stem.

In this form of the invention the fastener also comprises a substantially cylindrical shaped housing 42 formed at its upper end with an external annular flange 43 and at its lower end with an integral base 44 having a central bore 45. The slidable stem in this instance consists of a pair of individual sections 46 and 47 which are of substantially semi-cylindrical shape in cross-section as particularly shown in Fig. 10. The sections 46 and 47 are held in spaced relation at one end by means of the T-shaped spreader 48 which normally projects downwardly through the central bore 45 in the base 44. As in the preferred form of the invention, the combined diameter of the sections 46 and 47 and T-shaped spreader 48 is substantially equal to the diameter of the rivet holes 49 provided in the sheets 50 and 51 to be held in aligned relation for riveting.

The upper ends of the sections 46 and 47 pivotally support therebetween by means of a pin or the like 52 a lever 53, the pivoted end of which is formed with a cam like surface 54 adapted to engage the upper end of a sleeve 55 mounted for slidable movement on the sections 46 and 47. As is to be understood, the sleeve 55 is slidable with the sections 46 and 47 and is also slidable relative thereto upon actuation of the lever 53 as will be hereinafter described. The lower end of the sleeve 55 is tapered as shown at 56 in Figs. 7 and 8 of the drawings and when moved downwardly relative to the sections 46 and 47 engages the members 57 and 58 for urging the same outwardly into frictional engagement with the walls of the housing 42. The periphery 59 of the members 57 and 58 has slidable engagement with the walls of the housing 42, as the stem is moved downwardly through the housing. The sections 46 and 47 at diametrically opposite points are formed with notches 60 for receiving the lower end of the members 57 and 58, and this means of support combined with the sliding engagement of the area 59 causes said members to move axially with the sections 46 and 47. The wall of the members 57 and 58 opposite the area 59 tapers inwardly toward the stem as indicated at 61 and said tapered wall is adapted to be engaged by the tapered end 56 of the sleeve 55 upon actuation of lever 53 to urge the members 57 and 58 outwardly, whereby the sections 46 and 47 will be held in locked position relative to the housing 42.

While normally the members 57 and 58 will be free to move axially with the stem, in order to further assure that movement, there is employed a split ring 62 disposed within a groove 63 formed in the outer periphery of the members 57 and 58 and substantially centrally thereof. The members 57 and 58 are thus free to be wedged into engagement with the walls of the housing 42 upon contact being made with the sleeve 55 yet upon release of the sleeve from engagement with the members, the ring 62 will assure central positioning of said members so that they will be free to slide with the sections 46 and 47.

Interposed between the lower end of the members 57 and 58 and the base 44 of the housing 42, there is a compression spring 64 for constantly urging the sections 46 and 47 upwardly relative to the housing 42. As more particularly shown in Figs. 7 and 8, the lower end of the spring 64 rests upon the head of the T-shaped spreader 48 for retaining said spreader in a relatively fixed position at all times.

The lower end of each section 46 and 47 is formed with an enlarged portion 65 adapted to engage the lower sheet 51 whereby the work is resiliently held between the base of the housing 42 and the portion 65.

The operation and use of this form of the invention is substantially the same as in the preferred form. When initially applying the fastener, the lever 53 is in substantially the position shown in Figs. 6 and 7, with the sleeve 55 out of operative engagement with the members 57 and 58, which permits manual pressure to be applied to the sections 46 and 47 for projecting the same downwardly against the tension of the spring 64 so that the enlarged portions 65 will pass sufficiently beyond the spreader 48 to be flexed inwardly as contact is made with the walls of the holes 49 for insertion through the aligned holes as shown in Fig. 6. The entire fastener is then moved downwardly until the base 44 rests upon the upper face of the sheet 50. Upon the release of pressure on the sections 46 and 47, the action of the spring 64 will return said sections upwardly relative to the housing 42 to clamp the sheets between the enlarged portions 65 and the base 44 as shown in Fig. 7. The lever 53 is then manually swung on its pivot 52 from the position shown in Fig. 7 to that shown in Fig. 8 bringing the cam surface 54 into contact with the upper end of the sleeve 55 to force said sleeve downwardly until its tapered end engages the tapered walls 61 of the members 57 and 58. As the sleeve 55 engages the members 57 and 58 said members will be forced outwardly into locked engagement with the housing thereby preventing movement of either the housing 42 or sections 46 and 47. In the position shown in Figs. 8 and 9, the fastener is securely locked to the work so that the sheets will be held in perfect perforate alignment for the insertion of permanent rivets. When desiring to remove the fastener, it is merely necessary to swing the lever 53 from its Fig. 8 to its Fig. 7 position which will permit the sections 46 and 47 and the sleeve 55 to be moved downwardly upon the application of manual pressure thereby freeing the enlarged portions 65 from the spreader 48 for withdrawal from the holes 49.

In the form of the invention illustrated in Figs. 12 to 16, there is also employed a wedging action for locking the fastener on the sheet. In this instance the housing is in the form of a solid cylindrical block 66 having a central bore 67 formed throughout its length in which is slidably disposed a stem 68. The upper end of the stem 68 is formed with a head 69 while the lower end is split longitudinally as indicated at 70 to form a pair of sections 71, and each section is formed with an enlarged end 72 adapted to engage the lower sheet 73 as in the previously described forms.

A cap 74 is secured by any desired means onto the end of the block 66, the end wall of said cap being spaced from the bottom of said block and having a central bore 75 in vertical alignment with the bore 67. Supported between the end wall of the cap and the bottom of the block is a T-shaped spreader 76 which projects through the bore 75 and is normally disposed between the sections 71. The spreader 76 is held against axial movement by the bottom wall of the block 66 and the diameter of the sections 71 and spreader 76 is substantially equal to the diameter of the holes 77 formed in the plates 73 and 78.

The upper end of the block 66 is externally threaded as indicated at 79 and supports thereon a nut 80 formed with a tapered opening 81 which surrounds the stem 68. A series of balls 82 are confined within the tapered opening 81 and in the normal position of the fastener rest upon a boss 83 provided on the upper end of the block 66, said boss being preferably smaller in diameter than the smallest diameter of the opening 81. Interposed between the head 69 and balls 82 there is a compression spring 84 for constantly urging the stem 68 upwardly relative to the block 66.

In the use of this form of fastener, the nut 80 is screwed down on the block 66 so that the balls 82 are free to rest on the boss 83 when initially inserting the stem through the hole in the sheets. Manual pressure is exerted downwardly on the stem 67 through its head 69 to project the sections 71 beyond the spreader 76 whereby the enlarged ends of said sections are free to be flexed inwardly as contact is made with the walls of the holes 77 for insertion through said holes, and after said ends have passed through the holes, the block 66 is urged downwardly into contact with the face of the upper plate 78. Upon the release of pressure on the head 69, the compression spring 84 will urge the stem 67 upwardly thus bringing the enlarged ends 72 into engagement with the plate 73, thereby firmly retaining the plates 73 and 78 between the enlarged ends 72 and cap 74. These steps are illustrated in Figs. 12 and 13 after which the nut 80 is unscrewed to substantially the position shown in Fig. 14 whereupon the balls 82 will be lifted upwardly from the boss 83 until they become firmly wedged between the stem 67 and tapered wall of the opening 81. In this position the stem is locked against axial movement relative to the block 66 and likewise the block 66 is held in locked position on the upper face of the plate 78. To remove the fastener it is merely necessary to rotate the nut downwardly until the balls 82 come to rest on the boss 83 at which time the stem 68 will be free to slide axially, as manual pressure is applied, relative to the block 66 so that the sections 71 can be withdrawn from the holes 77.

From the foregoing it will be understood that each form of fastener is applied to and removed from the sheets to be riveted without the use of special tools and that after the fastener has been applied to the work so as to clamp the same between the enlarged ends of the sections and the base, actuation of the means provided will create a wedging action between the stem and housing whereby further movement of the stem relative to the housing is prevented. Thus the fasteners will be securely clamped to the face of the work and held in a clamped position while the sheets are receiving their permanent rivets.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A device for temporarily securing at least two perforated plate like elements with their perforations in vertical alignment preparatory to riveting comprising, a housing adapted to rest on the upper element, a stem mounted for slidable movement within said housing and insertable through aligned perforations of said elements for maintaining them in aligned position, means on the inserted end of said stem for engagement with the under side of the lower element, means associated with said stem for urging the same upwardly for clamping said elements between said housing and said first mentioned means, and other means for locking said stem relative to said housing in element clamping position.

2. A device for temporarily securing at least two perforated plate like elements with their perforations in vertical alignment preparatory to riveting comprising, a housing adapted to rest on the upper element, a stem mounted for slidable movement within said housing and insertable through aligned perforations of said elements for maintaining them in aligned position, means on the inserted end of said stem for engagement with the underside of the lower element, spring means effective for urging said stem upwardly for clamping said elements between said housing and said first mentioned means, and other means carried by said stem for locking said stem relative to said housing in element clamping position.

3. A device for temporarily securing at least two perforated plate like elements with their perforations in vertical alignment preparatory to riveting comprising, a housing adapted to rest on the upper element, a stem mounted for slidable movement within said housing and insertable through aligned perforations of said elements for maintaining them in aligned position, means on the inserted end of said stem for engagement with the under side of the lower element, spring means associated with said stem for urging the same upwardly for clamping said elements between said housing and said first mentioned means, and means surrounding said stem and active on said housing for locking said housing relative to said stem.

4. A device for temporarily securing at least two perforated plate like elements with their perforations in vertical alignment preparatory to riveting, comprising a member adapted to rest on the upper plate, a stem mounted for slidable movement within said member and insertable through aligned perforations of said plates for maintaining them in aligned position, means on the inserted end of said stem for engagement with the under side of the lower plate, means associated with said stem for urging the same upwardly for clamping said plates between said member and said first mentioned means, and wedging means for locking said member relative to said stem.

5. A device for temporarily securing at least two perforated plate like elements with their perforations in vertical alignment preparatory to riveting, comprising a member adapted to rest on the upper plate, a stem mounted for slidable movement within said member and insertable through aligned perforations of said plates for maintaining them in aligned position, means on the inserted end of said stem for engagement with the under side of the lower plate, means associated with said stem for urging the same upwardly for clamping said plates between said member and said first mentioned means, and means movable on said stem for wedging said member relative thereto, whereby said member will be held in locked engagement with said plates.

6. A device for temporarily securing at least two perforated plate like elements with their perforations in vertical alignment preparatory to riveting, comprising a member adapted to rest on the upper plate, a stem mounted for slidable movement within said member and insertable through aligned perforations of said plates for maintaining them in aligned position, means on the inserted end of said stem for engagement with the under side of the lower plate, means associated with said stem for urging the same upwardly for clamping said plates between said member and said first mentioned means, wedge means surrounding said stem having engagement with the interior of said member, and means movable relative to said stem and adapted to be actuated for urging said wedging means into locked engagement with said member, whereby said member will be held in locked position on said plate.

7. A device for temporarily securing at least two perforated plate like elements with their perforations in vertical alignment preparatory to riveting comprising, a housing, a stem mounted for slidable movement within said housing and insertable through aligned perforations of said plates for maintaining them in aligned position, means on the inserted end of said stem for engagement with the under side of the lower plate, a ring carried by said stem and disposed within said housing, a series of balls carried by said ring and having frictional engagement with the interior of said housing, means interposed between said ring and the base of said housing for urging said stem upwardly for clamping said plates between said housing and said first mentioned means, and a sleeve slidable on said stem adapted to contact said balls for moving the same into locked engagement with said housing, whereby said housing will be locked on said plates relative to said stem.

8. A device for temporarily securing at least two perforated plate like elements with their perforations in vertical alignment preparatory to riveting comprising, a housing, a stem mounted for slidable movement within said housing and insertable through aligned perforations of said plates for maintaining them in aligned position, means on the inserted end of said stem for engagement with the under side of the lower plate, a pair of members carried by said stem and slidable therewith, said members having one wall tapered and the other wall in frictional engagement with the interior of said housing, and a sleeve slidable on said stem for engagement with said tapered walls for urging said members into locked engagement with said housing, whereby said stem will be locked on said plates relative to said housing.

9. A device for temporarily securing at least two perforated plate like elements with the perforations in vertical alignment preparatory to riveting, comprising a member adapted to rest on the upper plate, a stem slidably held within said member and insertable through aligned perforations of said plates for maintaining them in aligned position, means on the inserted end of said stem for engagement with the under side of the lower plate, a boss formed on the upper end of said member, a series of balls normally held on said boss and surrounding said stem, means interposed between the upper end of said stem and said balls for urging said stem upwardly for clamping said plates between said member and said first mentioned means, and means on the upper end of said member adapted to be actuated for lifting said balls from said boss and wedging them against said stem, whereby said stem and member will be held in locked relation.

10. In a device of the character described, a housing, a stem slidable therein, spring means for moving said stem toward operative position, and manually operated means for locking said housing and stem together while the spring is stressed, whereby the spring is prevented from expanding suddenly in the event of the breakage of a part of the device.

PAUL VAN SITTERT.